United States Patent [19]

Terada et al.

[11] 4,427,710

[45] Jan. 24, 1984

[54] METHOD OF MANUFACTURING AN INSTANT BEAN CURD OR TOFU, AND THE TOJU MADE BY SUCH METHOD

[75] Inventors: Masaki Terada, Ohtsu; Akihiro Yoshimura, Kitanakakohji; Kohichiro Hohsai, Ibaraki; Junichi Minami, Tondabayashi, all of Japan

[73] Assignee: Nissin Shokuhin Kabushiki Kaisha, Osaka, Japan

[21] Appl. No.: 333,755

[22] Filed: Dec. 23, 1981

[51] Int. Cl.³ ................................................. A23L 1/20
[52] U.S. Cl. ..................................... 426/634; 426/460; 426/464; 426/507; 426/658
[58] Field of Search ............... 426/629, 634, 573, 460, 426/464, 507, 508, 658, 254

[56] References Cited

U.S. PATENT DOCUMENTS 4,137,339  1/1979  Kudo et al. ........................ 426/507

FOREIGN PATENT DOCUMENTS

| 45-31344 | 10/1970 | Japan | 426/634 |
| 48-68762 | 9/1973 | Japan . | |
| 49-116249 | 11/1974 | Japan . | |
| 52-38102 | 9/1977 | Japan | 426/634 |
| 56-35136 | 8/1981 | Japan . | |

*Primary Examiner*—Raymond N. Jones
*Assistant Examiner*—George C. Yeung
*Attorney, Agent, or Firm*—Merriam, Marshall & Bicknell

[57] ABSTRACT

Beans are soaked and ground to form a mush (go), and the mush is heated and powderized. A thickening agent having a gelatinizing property is mixed with the powder. The tofu is prepared by mixing the powder with water and an additional amount of gelatinizing material.

10 Claims, No Drawings

METHOD OF MANUFACTURING AN INSTANT BEAN CURD OR TOFU, AND THE TOJU MADE BY SUCH METHOD

This invention relates to a method of preparing instant "tofu" (bean curds) which enables one to easily prepare tofu merely by adding cold or hot water to a powder of "go" material of tofu, without the necessity of heating or boiling the mixture.

Heretofore, various research and development programs have been made to provide an instant tofu which enables anyone readily to prepare tofu at any time and place, and some products of this nature have been placed on the market. In the usual manufacture of tofu, washed soybeans are soaked in water, and after having swelled they are ground together with water into a mushy material called "go." The go is then heated and separated by filtration to produce soybean milk, soluble ingredients, and "okara" (bean curds refuse), the okara consisting mainly of insoluble substances. Most of the prior art instant tofus referred to above are made from the soybean milk prepared as described above or prepared from powdered soybean milk (dried soybean milk). In the prior art method, after being mixed and heated with an amount of water, for example, the soybean milk is coagulated in a vessel with an addition of a coagulant, or the soybean milk is mixed in advance with a coagulant and then coagulation is obtained by heating and boiling the soybean milk for several minutes and then leaving it to cool. These methods require heating means for the preparation of tofu and requires several minutes before tofu is obtained.

Furthermore, the use of soybean milk or powdered soybean milk results, in the course of its production, in a large amount of the by-products, okara. Despite its residual nutritive ingredients such as proteins, carbohydrates, and minerals, the okara has had only limited uses, such as livestock feed, and it is consumed very uneconomically from the standpoint of the effective use of food resources. However, the simple addition of okara in the course of tofu manufacture will result only in a poor taste of the tofu with a rough "feel" inevitable, and it may be very difficult to obtain a tofu having a substantial and yet smooth feel to the palate which is peculiar to tofu. Therefore, the constituents of okara have seldom been used in the manufacture of instant tofu.

It is an object of the present invention to provide a method of manufacturing instant tofu, in which the constituents of okara are effectively used.

Another object of this invention is to provide a method of manufacturing instant tofu which can be readily prepared by merely adding cold or hot water, without necessitating the use of heating means.

According to the method of this invention, the go made from bean materials is heated and then directly dried and powdered without being separated into soybean milk and okara, or the go is mixed with an acid or alkali earth metal salt and coagulated into curds and then dried and powdered. To produce tofu, the powder thus obtained is admixed with a gelatinizing agent used as a thickener, and coagulated in a form.

In accordance with this invention, the go obtained from bean material is heated at a temperature of approximately 90° to 100° C. for about 1 to 10 minutes, and preferably coagulated into curds by an addition of an acid or alkali earth metal salt. The reason for limiting the temperature to the range from 90° to 100° C. is that below 90° C. the detrimental substance in soybeans, such as trypsin inhibitor, is not sufficiently inactivated, and the characteristic flavor of tofu becomes feeble. Above 100° C., on the other hand, a browning in color and a change in odor occur and deteriorate the quality. The go used in this invention is made, as mentioned above, from common soybeans or defatted soybeans soaked in water (of about 13 to 15 parts to 1 part of soybeans for one night so that the water content becomes 120% by weight of the soybeans) and ground (by a colloid mill, for example, to a grain size finer than $50\mu$) and heated. The material for preparing go is not limited to soybeans, but one kind or a mixture of several kinds of beans may be used, such as peanuts and broad beans or water soluble isolated soybean protein may also be used. The heating step is for sterilization of various microorganisms, removal of grassy-smell, destruction of trypsin inhibitor, and improvement of the coagulating property. The heated go is directly transferred to the next powdering step, or, perferably, it is converted into curds before powdering it, to improve the taste, to facilitate the preparation, and to shorten the time required for preparation. As the coagulant for converting the go into curds, organic acids such as ardonic acids, uronic acids, citric acid, and malic and inorganic acids such as hydrochloric acid are used, and they are added in such an amount that the pH value of the go becomes approximately 3.5 to 5.5. Alkali earth metal salts such as calcium carbonate, calcium sulfate, alum, and magnesium sulfate can also be used, and added to the go in a quantity of about 0.1 to 10% by weight of the go when $CaSO_4.2H_2O$ is used, and when other salts are used, in a quantity equivalent to the $CaSO_4.2H_2O$ with respect to $Ca^{++}$. Lactones of ardonic acids and uronic acids such as gluconic lactone, arabonic lactone, galactonic lactone, and manonic lactone, which produce organic acids by decomposition under the presence of water and heat, can also be used. The heated go or curds obtained as described above is then powdered by a customary drying process such as freeze-drying. If the grain size of the powder is reduced to less than $50\mu$, in this case the taste and the feel of the tofu to the tongue will be remarkably improved with dissolved roughness and increased smoothness to the tongue peculiar to tofu. The curds powder is then mixed with a thickening agent having a gelatinizing ability and thoroughly stirred. The thickening agent such as alginate, pectin, and mannan, preferably by pectin (6% by weight of pectin is added to the curds powder) is gelatinized by a gelatinizing agent.

A given amount of the thus obtained mixed powder and water in an amount of about 8 to 10 times by weight of the mixed powder, are put into a vessel of a given form after manual stirring 20 to 30 times with, for examples, a dining fork, thoroughly mixing with a gelatinizing agent in an amount of 1/10–1/50 by weight of the mixed powder to gelatinize the above thickener. When this mixture is allowed to stand for about 3 to 15 minutes, tofu is formed. The gelatinizing agents used for gelatinizing the thickening agent include alkali earth metal salts such as calcium carbonate, calcium sulfate, alum, and magnesium sulfate, and saccharides such as frutose, sucrose, and glucose. Preferable gelatinizing agents here are calcium carbonate and calcium sulfate; other Ca salts and Mg salts are not favorable because they affect the taste of tofu adversely. Saccharides are also not favorable because they must be used in such large quantities to obtain the expected effect that the result is a too sweet tofu. However, if a tofu-like new soybean food having a sweet taste is to be produced, such as soybean milk added with sugar or honey for an easy-to-make drink, it may be favorable to use saccharides.

The present invention, as described above, makes it possible to utilize the insoluble ingredients (okara ingredients) in go, which has conventionally been removed in the process of tofu manufacture and used only as a livestock feed, effectively as a constituent of instant tofu which has a smooth feel to the tongue identical to the usual tofu. Thus, the invention largely contributes to the improvement of nutrition and the elevation of productivity, preventing the loss of the nutritious ingredients of beans and raising the yield. Further, the invention permits anyone to readily prepare tofu at any time and in any place only by admixing cold or hot water with the material, and thus it is very useful in respect to manufacture, nutrition, and preparation.

EXAMPLE 1

Five kilograms of defatted soybeans were soaked and swelled in 50 liters of hot water at 60° C. for about 1 hour and were finely ground to a grain size below 50μ. After being heated about 5 minutes at a temperature about 95° C., the ground material was spray-dried and 4.8 kg of powder having a grain size below 50μ was obtained. (The grain size below 50μ is easily attained by controlling the atomizer attached to the spray-drier.) Forty grams of this powder, 6 g of low metoxyl pectin, and 0.5 g of citric acid were mixed in a molding vessel and mixed with an addition of 400 ml of water. Then, it is added to 2.5 g of calcium carbonate and thoroughly mixed again. After the mixture was left to stand for 10 minutes at room temperature, a piece of tasty tofu, somewhat sticky but scarcely rough to the tongue and having a sesame-tofu-like appearance, was obtained.

EXAMPLE 2

Five kilograms of soybeans were soaked in 40 liters of water overnight, and after being ground, they were heated 5 minutes at 95° C. When the temperature was dropped to 90° C., it was added to 178 g of glucono delta-lactone and thoroughly stirred. After being left standing for about 2 hours, it was formed into curds. The curds were then freeze-dried and ground into 4.5 kg of curds powder. Forty grams of this powder and 3 g of sodium alginate were put into a molding vessel and thoroughly mixed with an addition of 400 ml of water. Then, the mixture was added to 1.5 g of calcium sulfate and thoroughly stirred again. After the mixture was left intact for 5 minutes at room temperature, a piece of tasty white tofu having a silk-strained-tofu-like appearance without any stickiness nor roughness was obtained.

What is claimed is:

1. A method for manufacturing an easy-to-prepare instant tofu comprising the following steps in sequence:
    (a) soaking a quantity of soybeans in water whereby said soybeans become swollen with water;
    (b) grinding a portion of the moisture-laden soybeans to a size smaller than 50μ;
    (c) heating the ground soybean material to a temperature in the range 90° C. to 100° C. for a period of about one to ten minutes;
    (d) drying and powdering said ground soybean material whereby the dried powder has a particle size less than 50μ;
    (e) admixing a thickening agent with said dried powder; and
    (f) adding water and a gelatinizing agent for gelatinizing said thickening agent to form tofu.

2. A method for manufacturing an easy-to-prepare instant tofu as claimed in claim 1, wherein said ground soybean material, after being heated to a temperature in the range 90° C. to 100° C. for a period of about one to ten minutes, is coagulated into curds by an acid or an alkali earth metal salt prior to said step of drying and powdering.

3. The method of claim 2 wherein the acid coagulant is selected from the group consisting of ardonic acids, uronic acids, citric acid, malic acid, and hydrochloric acid, and wherein said coagulant is added in an amount whereby the pH value of said ground soybean material is in the range 3.5 to 5.5.

4. The method of claim 2 wherein the alkali earth metal salt coagulant is selected from the group consisting of calcium carbonate, calcium sulfate, alum, and magnesium sulfate.

5. The method of claim 2 wherein the coagulant is selected from the group consisting of lactones of ardonic acids, lactones of uronic acids, gluconic lactone, arabonic lactone, galactonic lactone, manonic lactone, and glucono delta lactone.

6. The method of claim 1 wherein said thickening agent is selected from the group consisting of alginate, pectin and mannan.

7. The method of claim 1 wherein said gelatinizing agent is selected from the group consisting of calcium carbonate, calcium sulfate, alum, magnesium sulfate, fructose, sucrose, and glucose.

8. The method of claim 2 wherein said thickening agent is selected from the group consisting of alginate, pectin and mannan.

9. The method of claim 2 wherein said gelatinizing agent is selected from the group consisting of calcium carbonate, calcium sulfate, alum, magnesium sulfate, fructose, sucrose, and glucose.

10. An instant tofu prepared according to the method set forth in claim 1 or claim 2.

* * * * *